United States Patent [19]

Curtis et al.

[11] 4,139,073
[45] Feb. 13, 1979

[54] DIVIDER GEAR CASE SUPPORT FOR ARTICULATED VEHICLES

[76] Inventors: David L. Curtis; John L. Curtis, both of P.O. Box 1151, Great Falls, Mont. 59403

[21] Appl. No.: 747,314

[22] Filed: Dec. 3, 1976

[51] Int. Cl.² .............................................. B60D 1/02
[52] U.S. Cl. .................................... 180/51; 180/14 B
[58] Field of Search ............... 180/51, 52, 14 R, 14 B, 180/14 E, 139, 134, 135, 136, 137, 138

[56] References Cited

U.S. PATENT DOCUMENTS

| | | | |
|---|---|---|---|
| 2,827,715 | 3/1958 | Wagner | 180/51 X |
| 3,305,039 | 2/1967 | Molby | 180/51 |
| 3,349,864 | 10/1967 | Wagner | 180/51 |
| 3,773,129 | 11/1973 | Anderson | 180/139 |

*Primary Examiner*—Joseph F. Peters, Jr.
*Assistant Examiner*—Donn McGiehan
*Attorney, Agent, or Firm*—Clarence A. O'Brien; Harvey B. Jacobson

[57] ABSTRACT

The transfer gear case for a power dividing transmission is hingedly connected to one frame section of an articulated tractor vehicle and supported for angular displacement about an oscillation axis by the other frame section of the vehicle. The transmission output shaft is rotatably mounted within the transfer gear case about the oscillation axis and is connected by universal drive shafts to the vehicle wheels respectively supporting the two frame sections.

13 Claims, 6 Drawing Figures

DIVIDER GEAR CASE SUPPORT FOR ARTICULATED VEHICLES

BACKGROUND OF THE INVENTION

This invention relates to articulated tractor vehicles having separate, hingedly connected frame sections respectively supported by traction wheels to which power is delivered through a power dividing transmission assembly.

Heavy duty tractors having articulated frame sections to facilitate steering thereof, are plagued with failure of differentials, universal joints, bearings and support castings because of shaft misalignment and vibration resulting therefrom. Various power dividing drive train and gear case support arrangements for such articulated vehicles have been heretofore proposed as disclosed, for example, in U.S. Pat. Nos. 2,827,715; 3,115,205; 3,191,709; 3,270,829; 3,569,788 and 3,572,457 of which the inventor is aware. However, none of such prior art arrangements is believed to be capable of successfully coping with the problem to which the present invention is addressed. In most cases, the articulated frame sections of the vehicle are hingedly connected directly to each other about a vertical articulation axis while the transfer case for the power dividing gearing is fixedly carried by one of the frame sections as shown, for example, in aforementioned U.S. Pat. No. 2,827,715 to Wagner. In the aforementioned U.S. Pat. No. 3,270,829 to Steiger et al, the transfer gear case is hingedly connected to one of the frame sections about a vertical hinge axis while the frame sections are interconnected to each other about separate perpendicular intersecting articulation and oscillation axes.

It is therefore an important object of the present invention to provide an articulated power dividing drive arrangement for heavy duty tractor vehicles that is relatively simple and better able to cope with drive shaft misalignment and vibration problems as compared to prior art arrangements.

SUMMARY OF THE INVENTION

In accordance with the present invention, drive shaft vibration has been reduced to prevent early transmission failures by maintaining equal working angles between the wheel axles and the universal drive shafts drivingly connected to the opposite ends of the lower output shaft of the power dividing transmission. The gear case for the transmission is supported by the rear frame section of the vehicle through a bearing assembly accommodating angular displacement of the gear case relative to the rear frame section about a horizontal oscillation axis that coincides with the rotational axis for the lower output shaft of the transmission. The gear case is hingedly connected to the front frame section of the vehicle about a vertical articulation axis intersecting the oscillation axis to establish the pivotal connection between the frame sections. To obtain the shortest possible wheel base, an unequal number of universal shafts are utilized to form the two drive lines from the ends of the output shaft to the traction wheel differentials associated with the front and rear frame sections.

In one embodiment of the invention, the transmission consists of an endless drive chain interconnecting sprocket gears on the input and output shafts rotatably supported about parallel spaced axes in the gear case. The upper input shaft to which the vehicle engine is connected through a universal drive, is supported by an angularly adjustable, drive tensioning bearing assembly. Alternatively, the transmission may be of the shiftable countershaft change-speed type to enable driver controlled change in the drive ratio.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENTS

Figure 1:
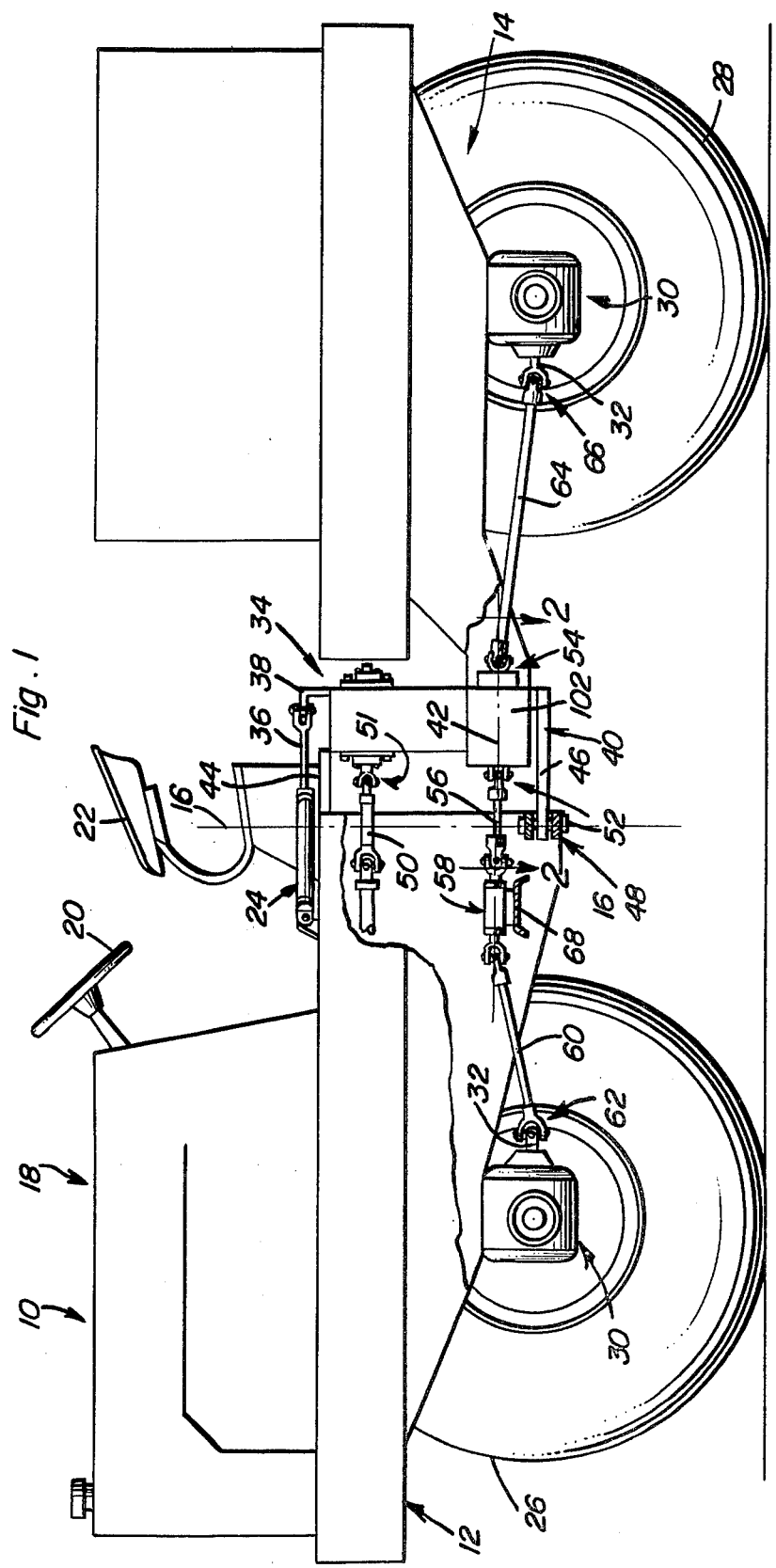
FIG. 1 is a side elevation view with parts broken away and shown in section of an articulated tractor vehicle embodying the power dividing drive arrangement of the present invention.

Referring now to the drawings in detail, FIG. 1 illustrates an articulated tractor vehicle generally denoted by reference numeral 10. The vehicle includes a front frame section 12 and a rear frame section 14 which are pivotally interconnected about a vertical articulation axis denoted by reference numeral 16. The front frame section carries the vehicle engine 18 and all controls including the steering hand wheel 20 located forwardly of the driver seat 22 and the usual fluid power steering operator 24 by means of which the vehicle frame sections are pivotally displaced relative to each other about articulation axis 16. A pair of traction wheel assemblies 26 and 28 respectively support the frame sections on the ground, each pair of wheels having aligned axles drivingly interconnected by a differential gear assembly 30. Differential input shafts 32 extend toward each other from the differentials 30 to form drive lines from the wheel axles to a power dividing transmission enclosed within a gear transfer case 34. The case 34 is located between the vehicle frame sections and is connected to the piston rod 36 extending from the fluid power operator 34 by means of an attachment bracket extension 38.

The gear transfer case 34 is carried by the rear frame section 14 through a forwardly extending support assembly generally referred to by reference numeral 40 in FIG. 1. The support assembly accommodates angular displacement of the gear transfer case 34 about a horizontal oscillation axis denoted by reference numeral 42, the axis 42 intersecting the articulation axis 16 located forwardly of the gear case 34. Upper and lower hinge plates 44 and 46 project forwardly from the case 34 to form part of a pair of vertically spaced and aligned pivot hinge assemblies 48 connected to the front frame section 12 through which the vertical articulation axis 16 is established. It will be apparent that both the articulation and oscillation axes 16 and 42 intersect in fixed relation to each other since they are both established through parts fixed to the same gear transfer case 34.

A power input from the vehicle engine 18 is connected by engine power shaft 47, universal joint 49, universal shaft 50 and a universal joint 51 as shown in FIG. 1 to the power dividing transmission adjacent the upper end of the case 34 while universal joints 52 and 54 are connected to the transmission adjacent the lower end of the case 34 to form drive line connections to the inputs 32 of the differentials 30. The drive line to the front differential is established by an output universal shaft 56 connected by an axially extensible universal connector assembly 58 to universal shaft 60 universally connected by joint 62 to the differential input 32 at some predetermined working angle relative to the wheel axles. A universal shaft 64 is connected to the other differential input at the same working angle by universal joint 66 and is connected by joint 54 to the power dividing transmission. Thus, an unequal number of universal shafts respectively form the drive lines to the two differentials on opposite sides of the gear transfer case 34. The axially extensible connector assembly 58 accommodates variations in longitudinal distance between the differentials as the frame section pivot relative to each other and is supported on the front frame section 12 by a cross support member 68. The articulation axis 16 is located equidistant between the universal joints at the ends of the input and output universal shafts 50 and 56 as shown in FIG. 1.

Figure 2:
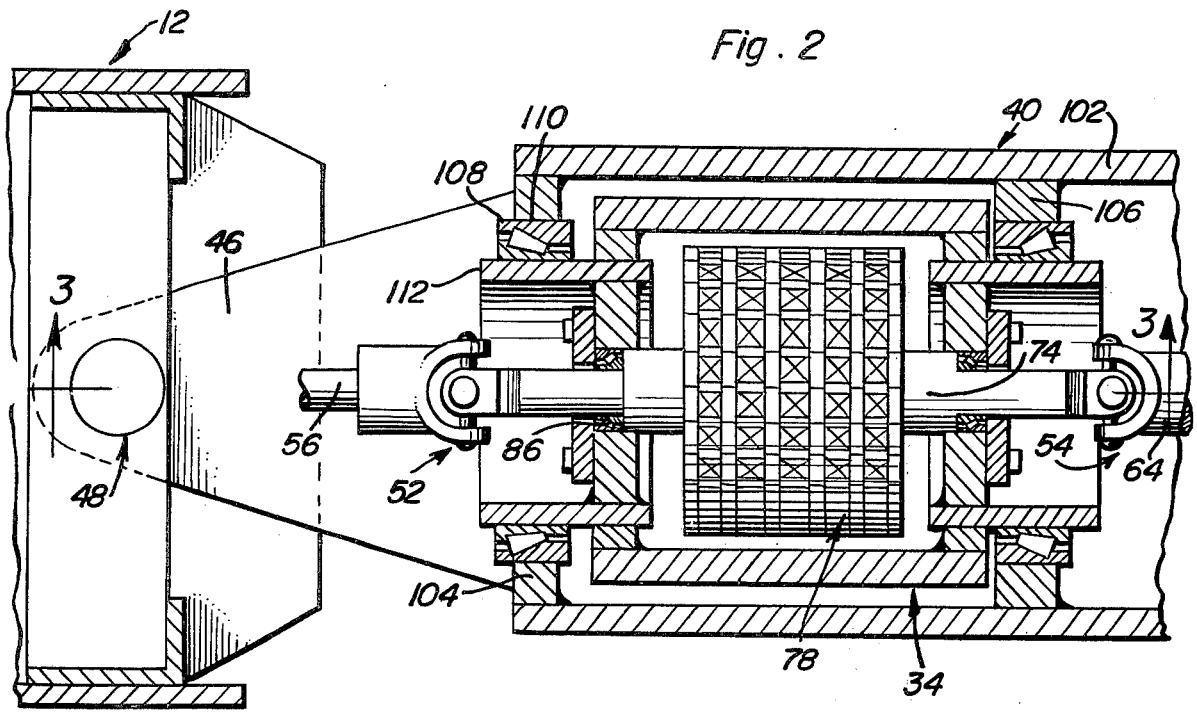
FIG. 2 is an enlarged partial section view taken substantially through a plane indicated by section line 2—2 in FIG. 1.
Figure 3:
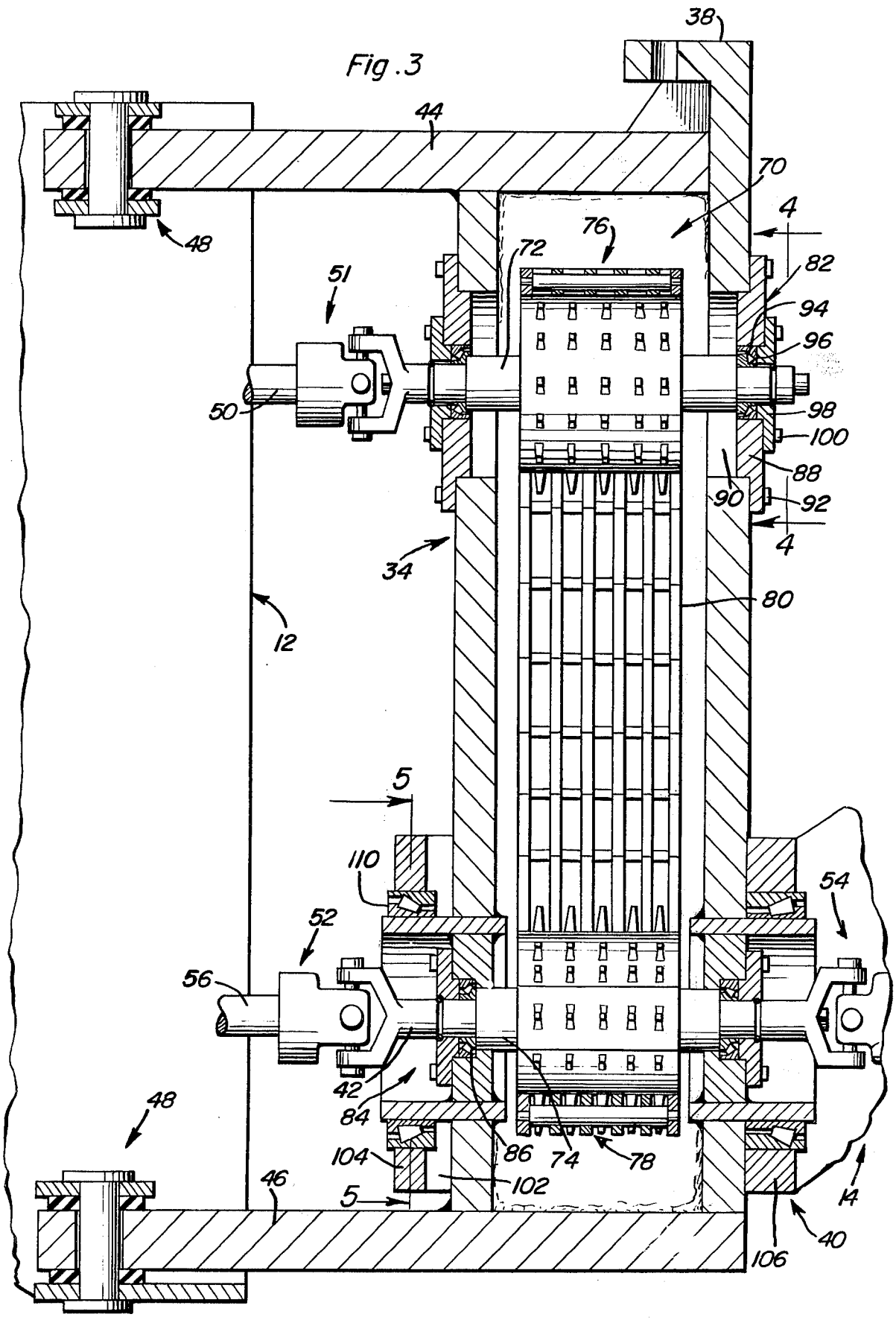
FIG. 3 is an enlarged section view taken substantially through a plane indicated by section line 3—3 in FIG. 2.

As more clearly seen in FIGS. 2 and 3, the power dividing transmission generally denoted by reference numeral 70 includes an input shaft 72 to which the engine is connected by shaft 50 and joint 51, and an output shaft 74 to which the drive lines to the differential 30 are connected at opposite ends through the universal joints 52 and 54 aforementioned. The upper and lower drive shafts 72 and 74 have sprocket gear assemblies 76 and 78 connected thereto about which an endless drive chain 80 is entrained within the case 34. The upper input shaft 72 is rotatably supported by a pair of adjustable bearing assemblies 82 mounted in the sides of the case while axially spaced bearing assemblies 84 including tapered roller bearings 86 rotatably support the lower output shaft about a rotational axis fixed to the gear case in parallel spaced relation to the rotational axis established for drive shaft 72 by the bearing assemblies 82.

Figure 4:
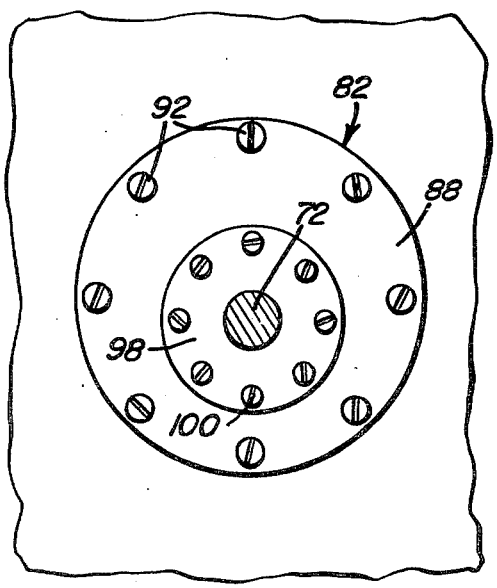
FIG. 4 is a section view taken substantially through a plane indicated by section line 4—4 in FIG. 3.

As were clearly seen in FIGS. 3 and 4, each bearing assembly 84 includes a shouldered bearing plate 88 projecting into a circular opening 90 formed in the side wall of the gear case and secured to the case by circumferentially spaced fasteners 92. A circular opening 94 is formed in bearing plate 88 in eccentric relation to the opening 90. Tapered roller bearings 96 are retained in the opening 94 by a retainer disc 98 secured to plate 88 by fasteners 100. Reduced diameter end portions of the drive shaft 72 extend through the retainer discs 98. It will be apparent that the distance between drive shafts 72 and 74 may be varied by angularly adjusting the positions of bearing plates 88 before fastening them to the side walls of the case 34 in order to obtain the desired drive tension for the drive chain 80.

Figure 5:
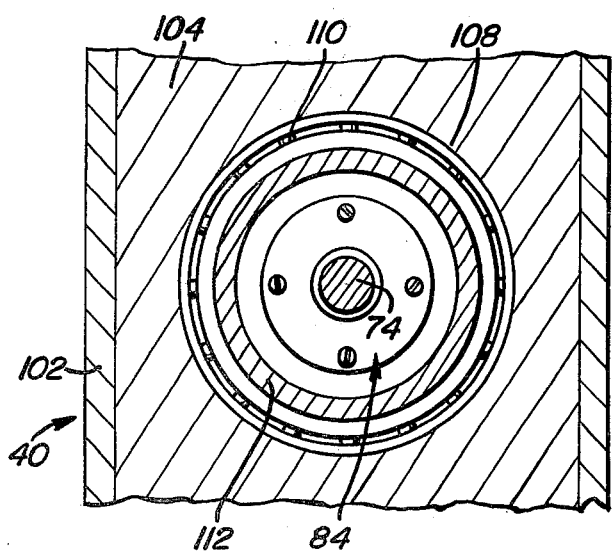
FIG. 5 is a section view taken substantially through a plane indicated by section line 5—5 in FIG. 3.

The bearing assemblies 84 for the lower output drive shaft 74 establish a rotational axis fixed to the gear case 34 which coincides with the oscillation axis 42 aforementioned, the oscillation axis being also fixed to the rear frame section by the support assembly 40. The support assembly as more clearly seen in FIGS. 2, 3 and 5, includes a pair of parallel spaced extensions 102 of the rear frame section straddling the lower end portion of the gear case and interconnected by cross frame members 104 and 106 forwardly of, and rearwardly of the gear case. Aligned circular openings 108 are formed in the cross frame members to mount tapered roller bearings 110 in order to rotatably journal a pair of tubular trunnions 112 in concentric relation to the lower output shaft 74. The trunnions 112 are connected to and project from the gear case 34 and mount the bearing assemblies 84 therein.

Figure 6:
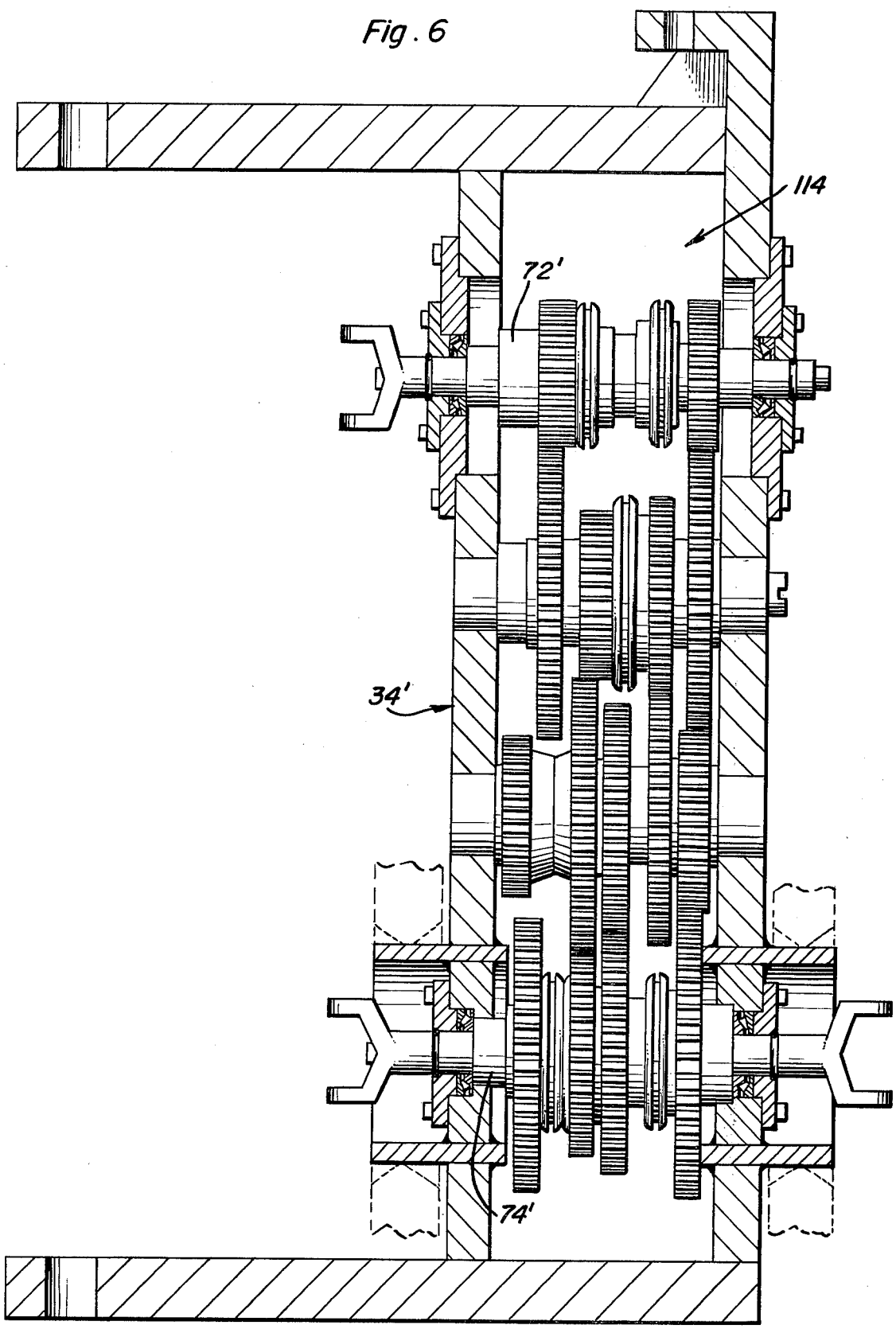
FIG. 6 is a section view similar to FIG. 3, showing another embodiment of the invention.

FIG. 6 illustrates a modification of the power dividing drive arrangement shown in FIG. 3, in that the drive chain transmission 70 is replaced by a countershaft-type of shiftable change-speed transmission 114. The transmission 114 drivingly interconnects the upper input shaft 72' with the lower output shaft 74' mounted for rotation about parallel spaced axes fixed to a gear transfer case 34' adapted to support the transmission 114. The drive ratio between the input and output shafts may accordingly be changed under driver control in a manner well known to those skilled in the art. The gear transfer case 34' and the drive shafts 72' and 74' associated therewith otherwise occupy the same relationship to the tractor vehicle installation as described with respect to FIGS. 1-5. In both cases, the upper input shaft may be extended rearwardly from the gear case for a power take-off drive of equipment mounted on the rear section of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an articulated vehicle having a pair of frame sections respectively supported by vehicle traction wheels, a transfer case, a power dividing transmission assembly mounted within the transfer case having input and output drive shafts and means rotatably mounting said drive shafts for rotation about spaced axes fixed relative to the transfer case, hinge means pivotally connecting the transfer case to one of the frame sections about an articulation axis intersecting one of said drive shaft axes, oscillation support means mounted on the other of the frame sections and pivotally connected directly to the transfer case for displacement thereof about said one of the drive shaft axes relative to the other of the frame sections and universal drive means connected to said drive shafts for transmitting power through said output drive shaft to the traction wheels.

2. The combination of claim 1 wherein said universal drive means includes an unequal number of universal drive shafts drivingly interconnecting the output shaft with the traction wheels at equal working angles.

3. The combination of claim 2 wherein said one of the drive shaft axes is vertically spaced below the other of the drive shaft axes.

4. The combination of claim 3 wherein said articulation axis intersects said one of the drive shaft axes in spaced axial relation to the oscillation support means.

5. The combination of claim 4 wherein said oscillation support means includes tubular trunnions connected to the transfer case through which the output drive shaft extends in coaxial relation, and bearing means carried by the other of the frame sections for rotatably supporting the tubular trunnions.

6. The combination of claim 1 wherein said one of the drive shaft axes is vertically spaced below the other of the drive shaft axes, and said articulation axis intersecting said one of the drive shaft axes in spaced axial relation to the oscillation support means.

7. The combination of claim 1 wherein said oscillation support means includes tubular trunnions connected to the transfer case through which the output drive shaft extends in coaxial relation, and bearing means carried by the other of the frame sections for rotatably supporting the tubular trunnions.

8. The combination of claim 1 wherein said transmission assembly further includes an endless drive chain interconnecting said input and output drive shafts and drive tensioning means connected to the rotatable mounting means for adjustment of the spacing between the drive shaft axes in parallel spaced relation to each other.

9. The combination of claim 1 wherein said universal drive means includes a pair of universal shafts respectively connected to the drive shafts, said articulation axis intersecting the universal shafts when aligned with the drive shafts equidistant from opposite ends of the universal shafts.

10. In combination with an articulated vehicle having a pair of frame sections respectively supported by vehicle traction wheels, having parallel spaced axles, a transfer case hingedly connected to one of the frame sections about a vertical articulation axis, a power transmission assembly mounted within the transfer case having a drive shaft, at least two universal shafts drivingly connecting the drive shaft to the axles of said traction wheels, and means supporting the transfer case on the other of the frame sections for maintaining equal working angles between said axles and the two universal shafts, including bearing means carried by the other of the frame sections for rotatably mounting the transfer case about an oscillation axis about which the drive shaft is rotatable.

11. The combination of claim 10 wherein said supporting means further includes trunnions journalled by the bearing means and connected to the transfer case, and means rotatably mounting the drive shaft within the trunnions for rotation about said oscillation axis.

12. The combination of claim 10 wherein the vehicle includes an engine mounted on one of the frame sections having a power shaft, said power transmission assembly further including an input shaft rotatably mounted by the transfer case in parallel spaced relation to the drive shaft, and a third universal shaft connecting the power shaft to the input shaft.

13. The combination of claim 12 wherein said articulation axis intersects the universal shafts respectively connected to the input and drive shafts when aligned there-with, equidistant from opposite ends of said last mentioned universal shafts.

* * * * *